United States Patent [19]
Grove et al.

[11] 3,860,033
[45] Jan. 14, 1975

[54] FLOW DIVERTING APPARATUS AND METHOD

[75] Inventors: Marvin H. Grove; Ronald G. Dunegan, both of Houston, Tex.

[73] Assignee: M & J Valve Company, Houston, Tex.

[22] Filed: Apr. 13, 1973

[21] Appl. No.: 350,820

[52] U.S. Cl............... 137/625.5, 251/367, 285/156, 137/557
[51] Int. Cl........................... F16k 11/02, F16k 1/44
[58] Field of Search....... 137/625.5, 625.48, 625.49, 137/625.4, 625.69, 557; 251/367; 285/156

[56] References Cited
UNITED STATES PATENTS

| | | | |
|---|---|---|---|
| 743,985 | 11/1903 | Koelkebeck | 137/625.69 |
| 1,057,554 | 4/1913 | Jacobs | 137/625.69 |
| 1,307,821 | 6/1919 | Kiesel | 137/625.69 |
| 2,357,986 | 9/1944 | Wichterman | 137/625.48 X |
| 2,542,390 | 2/1951 | Brown | 137/625.48 |
| 2,904,305 | 9/1959 | Novotny | 251/175 |
| 2,928,380 | 3/1960 | Krapf | 137/625.69 |
| 3,097,666 | 7/1963 | Antrim et al. | 251/357 X |
| 3,126,915 | 3/1964 | Hunt | 137/625.5 |
| 3,206,165 | 9/1965 | Salmon et al. | 251/357 X |
| 3,426,799 | 2/1969 | Kintner | 137/625.48 |
| 3,480,041 | 11/1969 | Whitlock | 137/625.5 X |
| 3,497,111 | 2/1970 | Savage | 137/625.47 X |
| 3,506,242 | 4/1970 | Aunspach | 251/361 |
| 3,542,065 | 11/1970 | Holbrook | 137/625.69 X |
| 3,635,249 | 1/1972 | Kirkman | 137/625.48 |

*Primary Examiner*—Henry T. Klinksiek
*Attorney, Agent, or Firm*—Flehr, Hohbach, Test, Albritton & Herbert

[57] ABSTRACT

Apparatus for selectively diverting flow in either one of at least two flow paths without making use of customary conventional valves. Such diverters may be incorporated in various systems, such as metering systems incorporating meter provers and tank farm systems as used in the petroleum industry. The diverter includes a cylindrical shaped body having a plurality of flow openings distributed along the length of the same. A plurality of sealing assemblies is carried by one or more operating rods extending axially of the body. These assemblies are caused to be moved in and out of sealing engagement with cylindrical sleeves that are located between the flow openings. The construction is such that when an assembly is moved into sealing position within a sleeve, there is a self induced pressure drop which is used to determine whether or not any leakage is occurring past the assembly. For metering systems the diverter has an inflow opening and two outflow openings through which the flow can be selectively directed. For use in tank farm systems the diverter is constructed in such a manner that three operating positions permit shutdown of flow into or from the tank, filling of the tank, and gravity flow of liquid from the tank.

7 Claims, 11 Drawing Figures

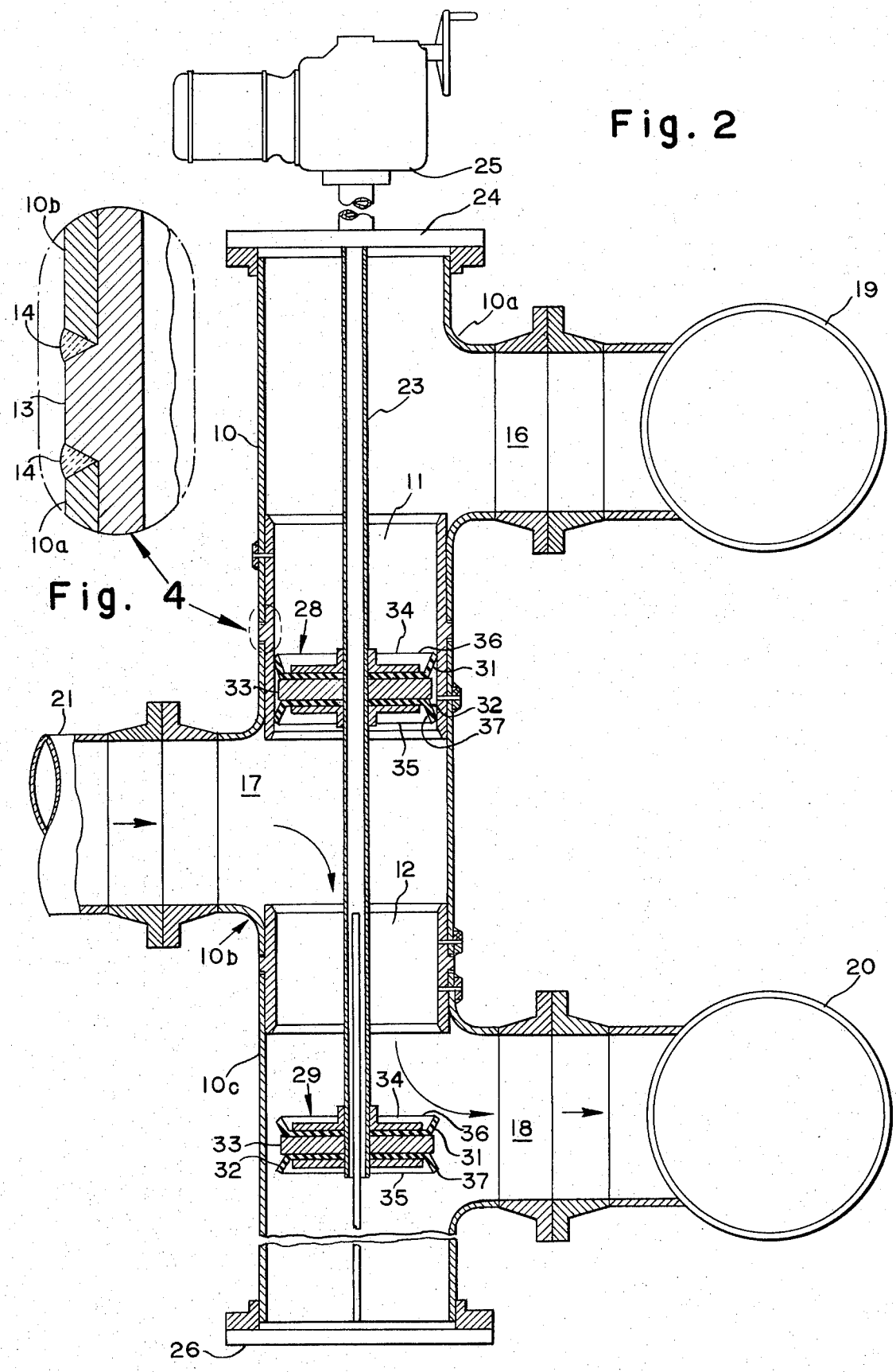

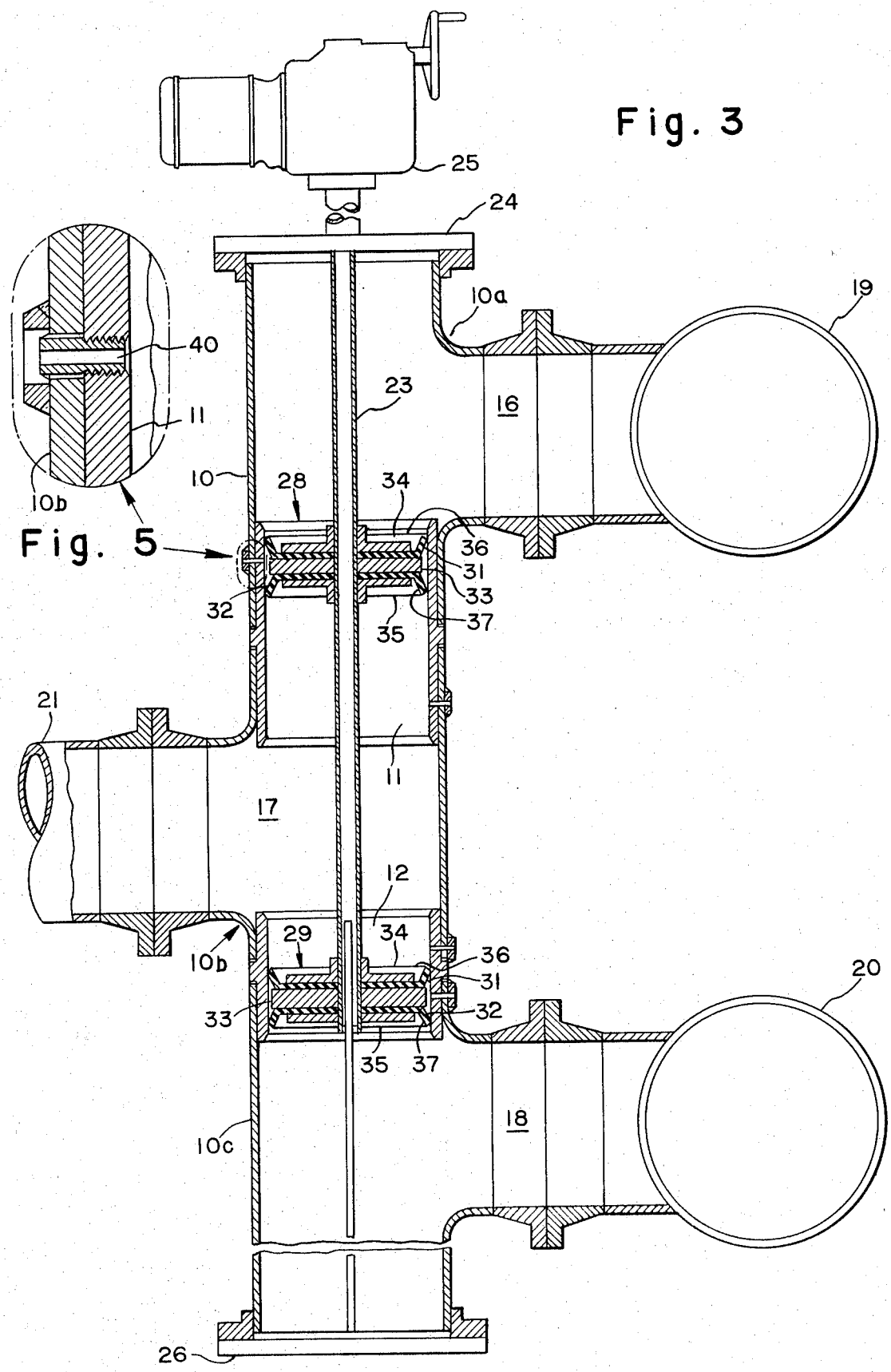

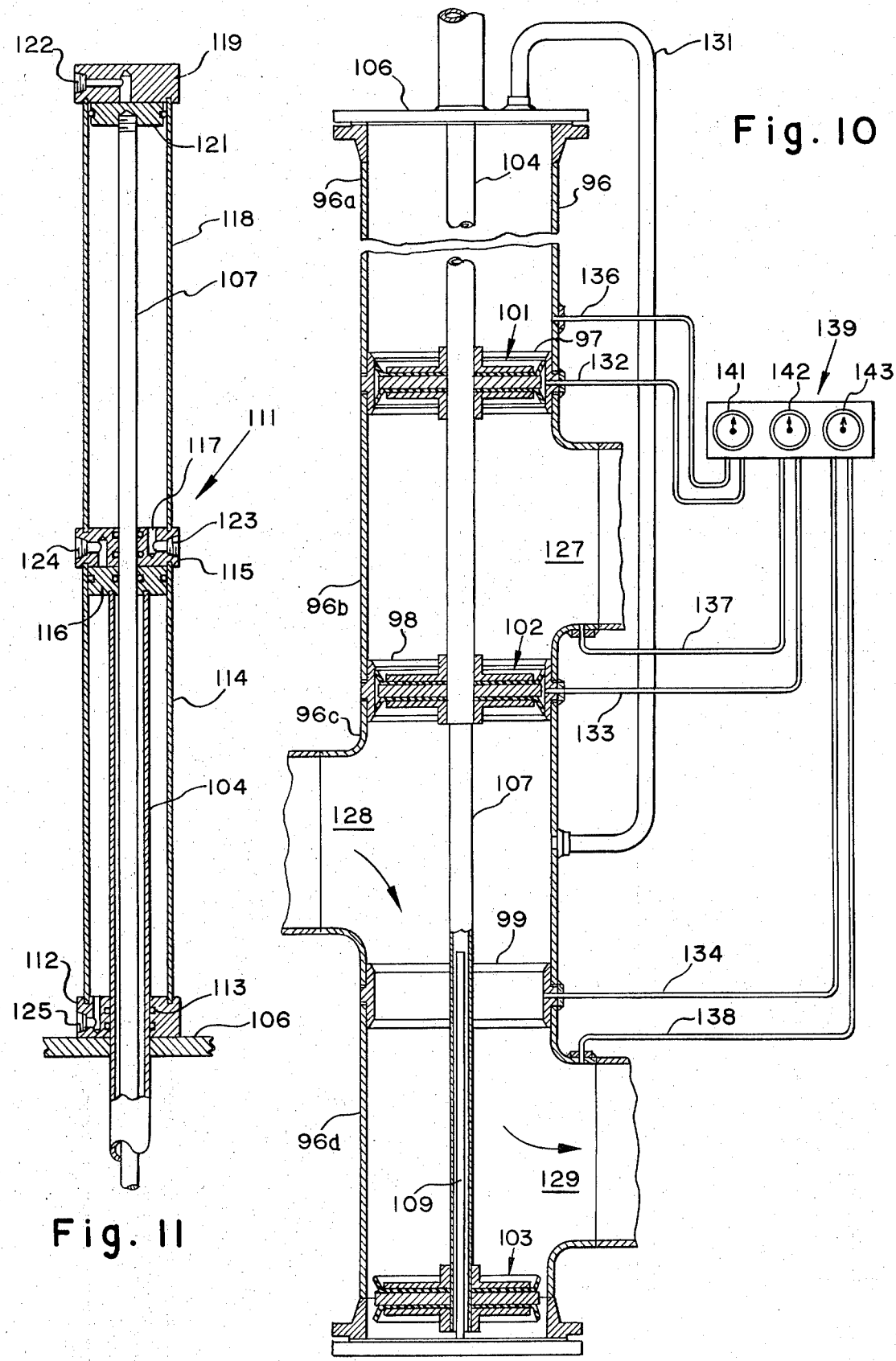

FLOW DIVERTING APPARATUS AND METHOD

BACKGROUND OF THE INVENTION

In the petroleum industry it is frequently necessary to provide means which will selectively divert flow according to a desired routing. For example, in the construction of metering systems making use of a plurality of meter runs together with a meter prover, it is desirable to selectively direct flow through any one of several meter runs, each provided with a flow meter, and then to divert the flow to either the inlet end of a meter proving run or to the downstream portion of the main flow line. Another example is in the filling and discharge of liquid from tanks in tank farm systems. Here liquid flow must be diverted into a selected tank for a tank filling operation. Also it is necessary to selectively divert gravity flow from the tank into a discharge line. In the past it has been common to install a sufficient number of conventional valves (e.g., gate valves) for the purpose of directing the flow as desired. Such valves, particularly when made in the larger sizes, and provided with power operators, are relatively expensive, and a considerable number of such valves may be required for diverting the flow as desired. In the event it is desired to operate the valves selectively from a central control station, the control and valve operating system required is relatively complicated and expensive. In many instances where conventional valves are used for flow diversion, leakage through a closed valve is a critical matter, and provision must be made for detecting any such leakage in each instance. This again complicates any system where a plurality of conventional valves are used for flow diversion.

In view of the above, there is a need for relatively simple flow diverters which may be used in a variety of systems where flow diversion is required, and which can be operated without excessive power requirements, without a control and operating system which is too complicated, and with simple leak detecting means that are reliable in operation.

SUMMARY OF THE INVENTION

It is an object of the present invention to provide a flow diverting or directing apparatus and method which is relatively simple in construction and operation, which has reliable means for leak detection, and which can be installed in a variety of systems in place of a plurality of conventional valves.

Another object is to provide flow diverting apparatus as described above which can be operated with a minimum amount of power, and which is well adapted for control from a remote operating station.

Another object of the invention is to provide a flow diverting apparatus incorporated in a metering system, wherein one of a plurality of such diverters can be selectively operated to carry out a meter proving run for a particular flow meter.

Another object of the invention is to provide flow diverting apparatus which is particularly adapted for use in tank farms for carrying out tank filling and discharging operations.

Additional objects and features of the invention will appear from the following description in which the preferred embodiments have been set forth in detail in conjunction with the accompanying drawing.

BRIEF DESCRIPTION OF THE DRAWING

FIG. 2 is a view like FIG. 1 but showing the movable parts in a second operating position.

FIG. 3 is a side elevational view like FIG. 1 but showing the operating parts in a third operating position.

FIG. 4 is a detail in section illustrating the manner in which sleeves are assembled in connection with other portions of the diverter body.

FIG. 5 is a detail in section illustrating the manner in which pressure connections are made to the interior of each sleeve forming a part of the body.

FIG. 10 is a side elevational view in section like FIG. 8 but showing the operating parts in a third operating position.

FIG. 11 is a side elevational view in section showing dual hydraulic means for operating the embodiments of FIGS. 8 – 10.

DESCRIPTION OF THE PREFERRED EMBODIMENTS

Figure 1:
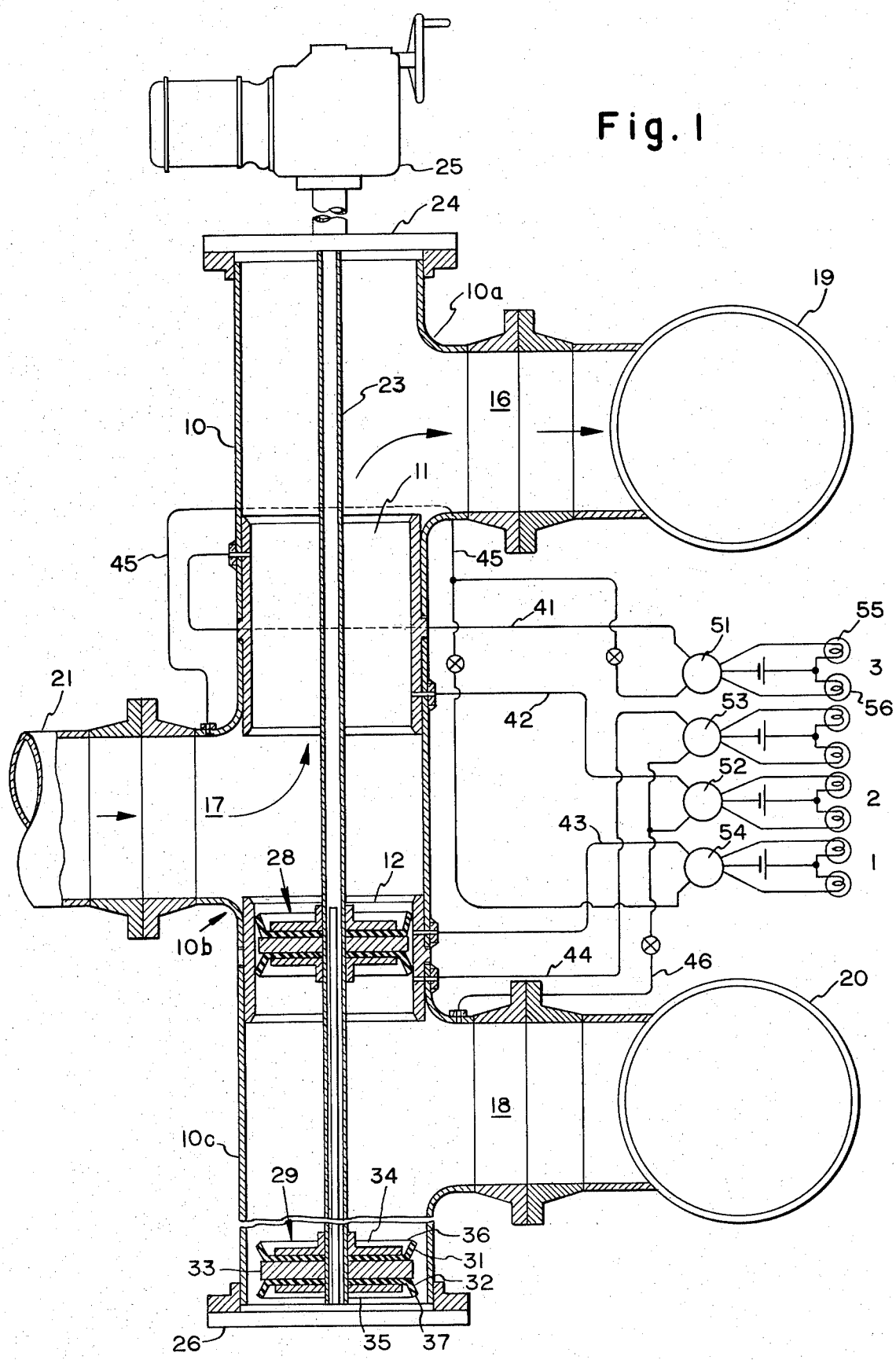
FIG. 1 is a side elevational view in section illustrating flow diverting apparatus made in accordance with the present invention, together with diagrammatically illustrated leak detection means.

FIG. 1 shows a diverter consisting of a body 10 which is generally cylindrical, and which in this instance is made by fabricating methods from parts including the T 10a, forming one end portion of the body, the T 10b forming the middle portion of the body, and the T 10c forming the other end portion of the body. In addition, the body includes the cylindrical sleeves 11 and 12 which are fabricated with the parts just mentioned. Thus, as illustrated in FIG. 4, each sleeve is shown provided with a rib 13 which is interposed between the adjacent body sections 10a and 10b and joined thereto as by means of welds 14. The two sleeves have chamfered ends as illustrated in FIG. 1.

The body section 10a provides a side flow opening 16, and the body sections 10b and 10c likewise provide flow openings 17 and 18. Flow opening 16 is shown connected to a header 19, flow opening 18 to a header 20, and opening 17 to pipe 21. Assuming that the diverter is incorporated in a metering system which includes a meter prover, the headers 19 and 20 may respectively be discharged and prover headers and pipe 21 may connect to the outlet end of the metering pipe.

Extending axially within the body 10 there is an operating rod or tube 23 which extends through the body end closure 24 and is connected with the power operator 25. This operator may be any one of several types which can be controlled from a remote point, as for example, one of the electrical or hydraulic types. The other end of the body is provided with a closure 26. Two separate sealing assemblies 28 and 29 are mounted in axially spaced relationship on the rod 23.

These assemblies can be identical in construction, consisting of cup-shaped sealing members 31 and 32 made of resilient material such as suitable synthetic rubber assembled on opposite sides of an annular spacer 33. Annular clamping members 34 and 35 complete the assembly. The oppositely directed resilient flanges 36 and 37 of the resilient sealing members 31 and 32, when relaxed, have an external diameter that is slightly greater than the internal diameter of the sleeves 11 and 12. When an assembly (e.g., 28) is moved to bring it within one of the sleeves, as illustrated in FIG. 1, the outer peripheral surfaces of the flanges 36 and 37 establish sealing contacts with the inner cylindrical surface of the sleeve on two axially spaced annular areas. In addition, the flanges are contracted as they are moved into the sleeve, with the result that the static pressure in the confined space between the sealing members 31 and 32 is substantially reduced. As disclosed in copending application Ser. No. 274,441 filed July 24, 1972, this self induced pressure drop can be utilized to determine if there is any leakage past the sealing assembly.

It will be seen from FIG. 1 that the sleeve 11 is interposed between the flow openings 16 and 17. Sleeve 12 is interposed between the flow openings 17 and 18.

Three operating positions of the operating rod 23 and the sealing assemblies are shown in FIGS. 1, 2 and 3. In the position shown in FIG. 1, the assembly 28 is within the sleeve 12, and therefore forms a seal which prevents any interflow between openings 17 and 18. However, flow may occur between openings 16 and 17. In the second position shown in FIG. 2 the assembly 28 is within the lower portion of the sleeve 11, and therefore forms a seal which prevents any interflow between the openings 16 and 17. However, interflow may occur between openings 17 and 18, because the second assembly 29 is located near the opening 18 but is not in sealing relation with a sleeve. In the position shown in FIG. 3, the assembly 28 is within the upper portion of the sleeve 11, and therefore forms a seal which prevents interflow between the openings 16 and 17. In addition, the assembly 29 is within the sleeve 12 and therefore forms a seal which prevents interflow between openings 17 and 18.

For each of the operating positions just described, indicating means is provided to appraise the operator of any leakage past one or both of the assemblies when within the sleeves. For this purpose, suitable fittings may be employed as illustrated in FIG. 5. Thus in this instance the fitting indicated extends through the wall of the body and the adjacent portion of the sleeve 11 to form a duct 40 to which connection can be made exterior of the body. Sleeve 11 is provided with two such fittings, thereby providing ducts for making connection with the external pipes 41 and 42. Sleeve 12 is provided with two such fittings for making external connection with the pipes 43 and 44. For the purpose of providing a reference pressure, a pipe 45 is shown in communication with the flow opening 17 and pipe 46 is shown connected to the flow opening 18.

Indicating means is provided exterior of the body for indicating the existence of a self induced pressure differential for each of the sealing assemblies, and the maintenance of this pressure differential over a period during which the diverter is being used. The particular means illustrated in FIG. 1 consists of differential pressure operated electrical switches 51, 52, 53 and 54. Each of these devices is provided with two closed fluid chambers separated by a movable fluid operated member, with one electrical contact being movable in conjunction with movement of the member to close upon either one of two stationary contacts. The setting of each switch can be such that when the differential pressure is less than a desired predetermined value, the movable contact is closed upon one of the stationary contacts. However, when the differential pressure is above this predetermined value, as is normally induced when a closure assembly is moved into a sleeve, the movable contact closes upon the other stationary contact. Simple indicating circuits as illustrated may be connected with the contacts of each switch, with these circuits operating means such as the signal lamps 55 and 56. Thus, if the differential pressure in connection with a particular closing assembly is below a given predetermined value, one signal lamp, say lamp 55, is illuminated, and the other lamp 56 is extinguished. Conversely, if the differential pressure is above the predetermined value, lamp 56 is illuminated and lamp 55 extinguished.

Operation of the diverter illustrated in FIGS. 1–3 is as follows. For the positioning of the sealing assemblies shown in FIG. 1, flow may occur from the pipe 21 through the sleeve 11 and into the header 19. For the position shown in FIG. 2, flow from the pipe 21 is shut off to the header 19 but flow may occur to the header 20. When the parts are positioned as in FIG. 3, flow from the pipe 21 is shut off to both the headers 19 and 20.

Figure 6:
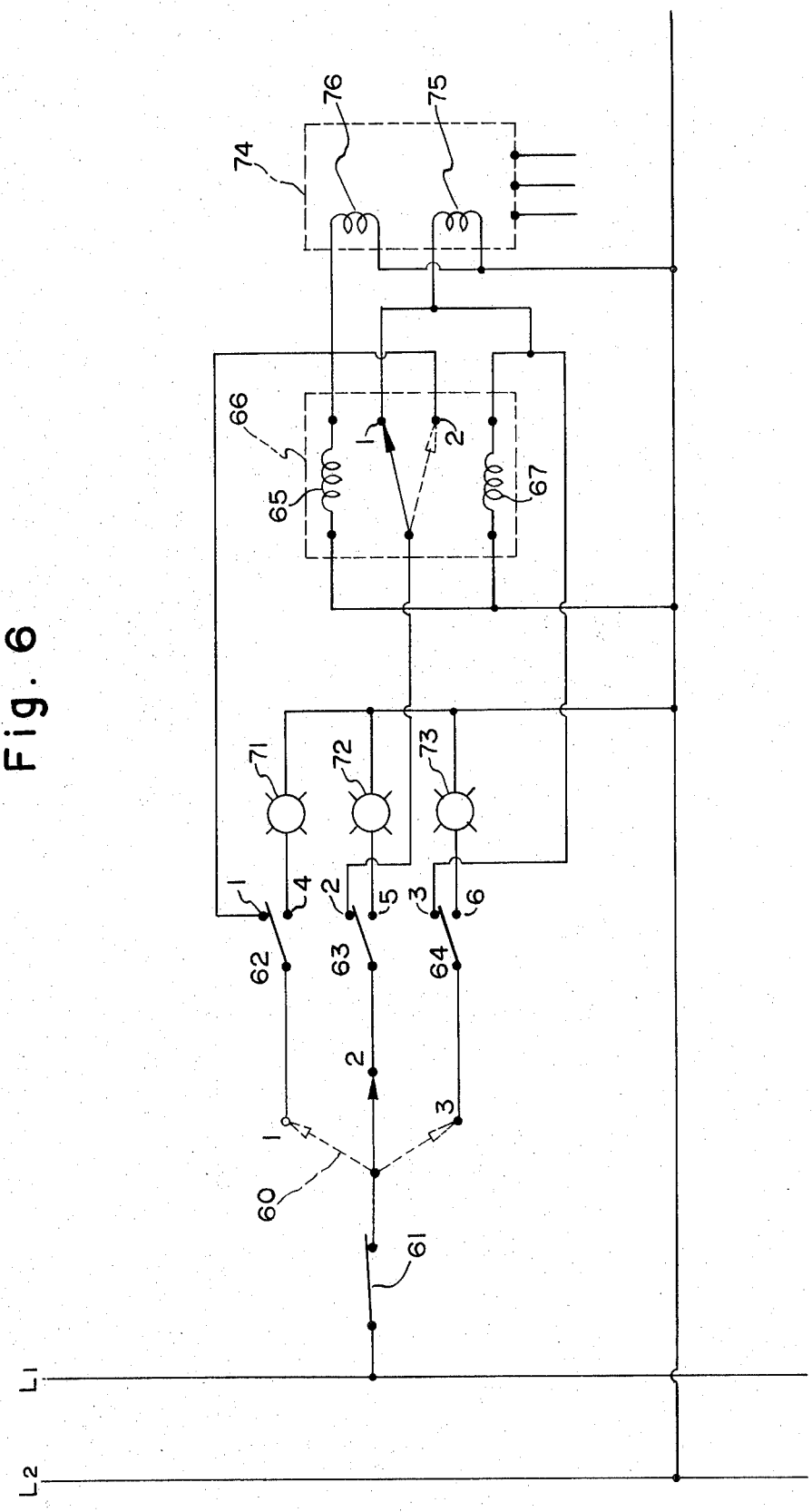
FIG. 6 is a circuit diagram for automatic cycling of the diverter operator.

The power operator 25 may be controlled manually to position the operating rod 23 in the three positions just described. However, it is desirable to provide control circuit means including a three-way switch which will automatically effect positioning after the operator selects the position desired. A diagram of such a circuit arrangement is shown in FIG. 6. It consists of a three position switch 60 having its blade connected to the power supply line L1 through the series switch 61. Limiting switches 62, 63 and 64 are associated with the power operator and are normally closed, but opened when a desired position has been reached. Limiting switches 62 and 64 are actuated at the ends of the stroke of the rod 23, whereas switch 63 is actuated when the rod is in an intermediate position. For simplicity, all three limiting switches are shown closed. The blades of the three limiting switches are connected to the contacts 1, 2 and 3 of the positioning switch 60. the contacts 1, 2 and 3 of the limiting switches 62, 63 and 64 are connected respectively to one terminal of the winding 65 of the bistable switch 66, to the blade of the switch 66, and to the other winding 67 of the switch 66. The other terminals of the windings 65 and 67 are connected to the line L2. Indicating lamps 71, 72 and 73 are connected to the line L2 and to the contacts 4, 5 and 6 of the limiting switches. The bistable switch 66 is constructed whereby when winding 65 is energized the blade closes upon contact 1 and remains closed upon this contact until winding 67 is energized, at which time the blade closes upon contact 2. Block 74 represents a reversing controller for the electrical motor of the power operator. When winding 75 is energized, the power operator is caused to retract the operating rod 23, or in other words, move this rod upwardly to its limiting position shown in FIG. 3. When winding 76 is energized, the motor of the power operator is reversed to extend the operating rod 23 until the limiting position shown in FIG. 1 is reached.

As previously mentioned, the limiting switches 62 and 64 are so located in connection with the power operator that switch 62 is operated to close upon contact 4 when the rod 23 is fully retracted to the position shown in FIG. 3, and limiting switch 64 is actuated to close upon contact 6 when the operating rod is extended to the limiting position shown in FIG. 1. Limiting switch 63 is so located and coordinated with the power operator that it is actuated to close upon contact 5 when the operating rod reaches the position shown in FIG. 2.

Operation of the circuitry shown in FIG. 6 is as follows. When the switch 61 is open, the system is disabled. If the operating rod is initially in the position shown in FIG. 1, and the operator desires to move it to the position shown in FIG. 2, then the selecting switch 60 is manually moved to the second contact, and the switch 61 closed. This serves to complete a circuit through the limiting switch 63, and bistable switch 66, to energize the winding 75. This causes the power operator to retract the rod 23 until it reaches the position of FIG. 2, at which time the limiting switch 63 is actuated to close its blade upon contact 5, thus deenergizing winding 75 and illuminating the signal light 72. When it is desired to move the operating rod to the position shown in FIG. 3, the selecting switch 60 is moved to the third contact 3 whereby the winding 75 is again energized to continue movement of the operating rod to the limiting position shown in FIG. 3. If it is now desired to move the rod from the position shown in FIG. 3 back to the position shown in FIG. 1, the selecting switch 66 is shifted back to the first contact, thus causing the winding 65 of the bistable switch 66 to be energized, with the result that the blade of this switch is closed upon contact 1. This serves to energize the winding 76, thus causing the power operator to move the operating rod back to the position shown in FIG. 1. By use of the bistable switch, the operator may shift directly between the limiting positions shown in FIG. 3 and FIG. 1, without causing automatic stopping in the intermediate position of FIG. 2.

Figure 7:
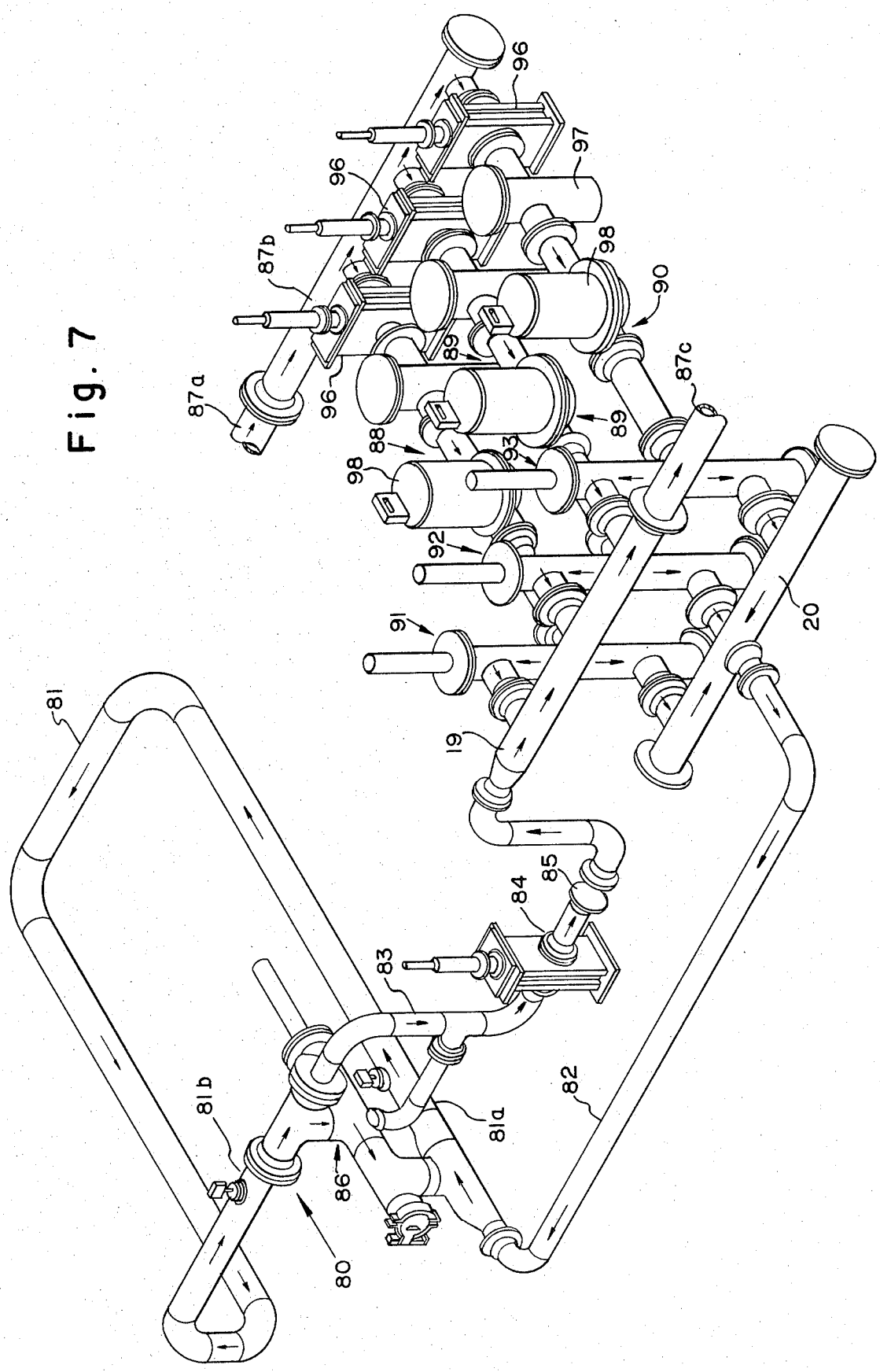
FIG. 7 is a perspective view illustrating a complete metering system including metering devices and a meter prover, and incorporating a plurality of diverters of the type illustrated in FIGS. 1 – 3.

FIG. 7 illustrates a system making use of the diverter of FIGS. 1 - 3. The system includes meter prover 80 consisting of the metering pipe loop 81 having its inlet end portion 81a connected to the header 20 by pipe 82. The outlet end portion 81b of the metering pipe is connected by pipe 81 to the header 19. A gate valve 84 and check valve 85 are shown connected in line 83. The inlet and outlet ends of the meter prover pipe are also interconnected by the interchange 86, which serves to receive a sphere after a meter proving run and to launch the sphere into the inlet end portion 81a when a meter proving run is commenced. It also serves as a seal between the inlet and outlet ends of the metering pipe during a proving run. Various types of interchanges can be used for this purpose, for example, the one disclosed and claimed in copending U.S. application Ser. No. 331,252, filed Feb. 9, 1973 in the joint names of M. H. Grove and R. G. Dunegan.

The upstream portion 87a of the main line is connected to the header 87b which inturn connects with the several parallel metering runs 88, 89 and 90. A plurality of diverters 91, 92 and 93 constructed as illustrated in FIGS. 1 - 3 are connected to the outlet ends of the meter runs 88, 89 and 90. More specifically, the flow opening 17 of each diverter is connected to the outlet end of the one of the meter runs, while the flow openings 16 and 18 of each diverter are connected respectively to the headers 19 and 20. The meter runs may be identical, with each run consisting of a shutoff valve 96, a strainer 97, and a flow meter 98. Header 19 connects to the downstream portion 87c of the main line.

The system of FIG. 7 operates as follows. When the meter prover is not in use, and valve 84 is closed, one or more of the gate valves 96 is open to meter the flow. Under such conditions, the diverters corresponding to the meter runs being used are positioned as shown in FIG. 1 whereby flow is diverted into the downstream portion 87c of the main line. If it is desired to check the accuracy of any one of the meters 97, or to effect accurate calibration of the meter readings, valve 84 is opened and that one of the diverters corresponding to the meter 97 to be calibrated is shifted to the position shown in FIG. 2. This diverts the flow occurring through one of the meter runs into the prover header 20, and from thence the flow occurs through the metering pipe 81 and through pipe 83, valve 84, check valve 85 and header 19 to the downstream main line portion 87c. During a meter proving run the remainder of the diverters, namely, 92 and 93, are positioned as shown in FIG. 3 whereby no flow occurs through the same. After a run has been completed all or some of the diverters may be positioned as shown in FIG. 1 to direct flow into the downstream portion of the main line and to bypass the meter prover. The procedure just described can be repeated for either one of the meter runs.

It will be evident that when the diverter is used in a proving system as shown in FIG. 7, it provides simple means for diverting flow passing through a meter run into either the meter prover or into the downstream portion of the main line, or to shut off such flow while another meter run is being used in conjunction with the meter prover.

Figure 8:
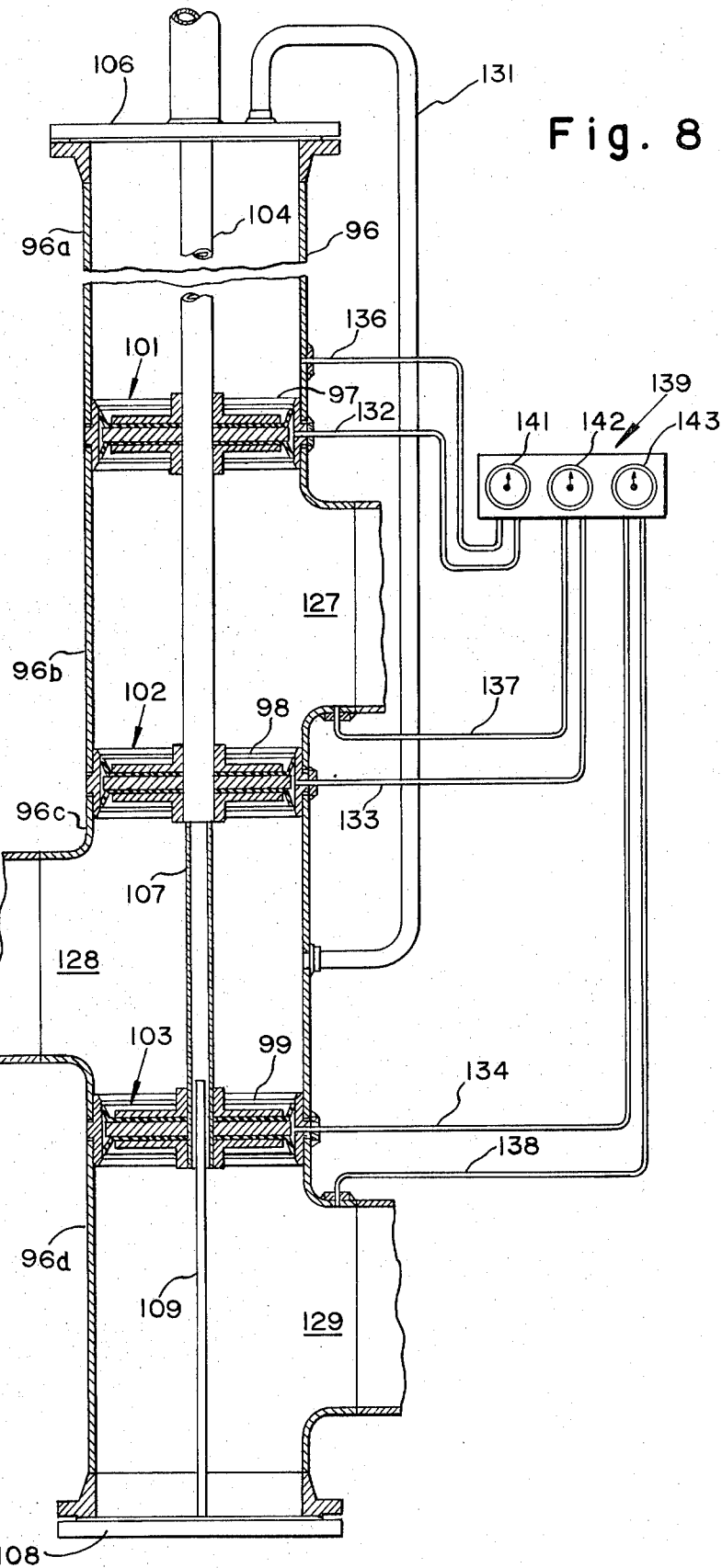
FIG. 8 is a side elevation in section illustrating another embodiment of the invention which is particularly adapted for use in connection with tanks.
Figure 9:
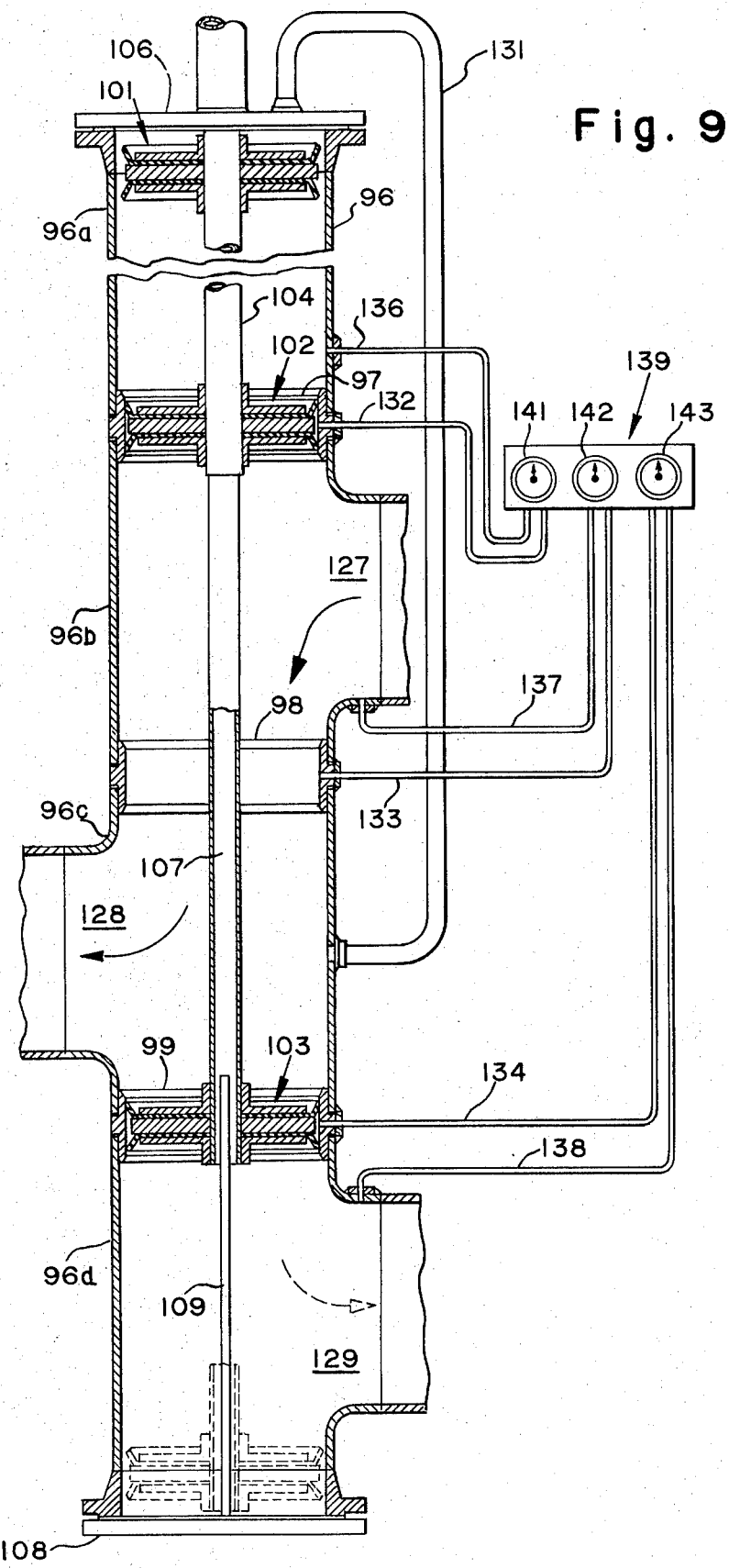
FIG. 9 is a view like FIG. 8 but showing the operating parts in a second operating position.

FIGS. 8 - 10 show another embodiment of the invention intended to be used in conjunction with the fluid storage tanks of a tank farm system. It consists of an extended body 96 which is generally cylindrical, and which can be made by fabricating together sections 96a, 96b, 96c and 96d, and the cylindrical sleeves 97, 98 and 99, in the manner described in connection with FIG. 4. The sections 96b, 96c and 96d are T's whereas the section 96a is cylindrical. Three sealing assemblies 101, 102 and 103 are disposed within the body and adapted to cooperate with the cylindrical sleeves 97, 98 and 99. These sealing assemblies are made in the same manner as described in connection with FIGS. 1 - 3. The assemblies 101 and 102 are fixed to a hollow operating rod 104 which extends through the end closure 106. The assembly 103 is fixed to a hollow rod 107 which extends telescopically through the rod 104. The end closure 108 of the body may be provided with a guide rod 109 which extends upwardly and slidably within the hollow rod 107. A dual hydraulic operator 111 as shown in FIG. 11 is mounted upon the end closure 106 and is provided with two pistons that are operatively connected to the hollow rods 104 and 107. While the construction of this operator may vary, the type illustrated consists of a mounting member 112 which is carried by the end closure 106, and through which the hollow rod 104 slidably extends. Suitable sealing means 105 (e.g., O-ring type) prevents leakage past the rod 104. One end of a cylinder 114 is secured to the mounting member 112, and the other end of this cylinder is secured to the member 115 which forms a closure for that end of the cylinder. A piston 116 has a slidable seal fitted within the cylinder 114, and is secured to the corresponding end of the rod 104. Rod 107 extends through the member 115 and is sealed with respect to the same by the sealing means 117 (e.g., the O-ring type). A second cylinder 118 has its one end fixed to the member 115, and its other end provided with the closure 119. A second piston 121 within the cylinder 118 is fixed to the rod 107. Ports 122 and 123 provide means for making hydraulic connections with the ends of the cylinder 118. Similar ports 124 and 125 provide means for making hydraulic connections with the ends of the cylinder 114.

The power operating arrangement described above makes it possible to move either rod 104 or 107 axially of the diverter body between definite limiting positions. Known types of hydraulic systems may connect with the cylinders 114 and 118, together with control valve means, to secure the desired controlled operation.

The body construction described above provides three flow openings 127, 128 and 129. These openings are provided by the T body sections 96b, 96c and 96d. Assuming that the diverter is to be used with a liquid storage tank and in connection with carrying out tank filling and discharge operations, the opening 127 is connected to the fill manifold of the tank. The opening 128 is connected to the lower portion of the tank, and the opening 129 to the so-called suction manifold. This suction manifold connects to the inlet side of pumping means used when liquid is being withdrawn from a tank.

The three operating positions for the sealing assemblies 101, 102 and 103 are shown in FIGS. 8, 9 and 10. In FIG. 8 each of the assemblies is within an associated sleeve whereby no flow can occur to any of the flow openings 127, 128 and 129. When the rod 104 is retracted to position the closure assemblies 101 and 102, as shown in FIG. 9, without changing the position of the assembly 103, flow may occur from the fill manifold into the tank by way of flow openings 127 and 128, and as indicated by the arrows in FIG. 9. When the assemblies 101 and 102 are repositioned within their corresponding cylindrical sleeves 97 and 98 as shown in FIG. 10, and the assembly 103 is moved to the position shown in FIG. 10 by projecting the operating rod 107, no flow can occur between the openings 127 and 128, but flow may occur as shown by the arrows in FIG. 10, or in other words, flow may occur from the tank connected to opening 128 and from thence through flow opening 129 to the suction manifold.

Under certain operating conditions, as when the sealing assemblies are positioned as in FIG. 8, the pressures acting upon the assembly 102 may be unbalanced whereby a substantial thrust is applied. To provide a balance of forces acting upon assembly 102 under such conditions, a bypass pipe 131 is provided. One end of this pipe connects through the end closure 106 of the body, and the other end connects to the interior of the body section 96c through one side. Thus when the closure assemblies are positioned as in FIG. 8, the forces acting upon opposite sides of the closure 102 are balanced by pressure on assembly 101, thus avoiding the necessity of applying undue force for moving this assembly out of the sleeve 97.

FIGS. 8 – 10 show means incorporated with the diverter for indicating leakage past any one of the sealing assemblies when an assembly is within a corresponding sleeve. For this purpose, pipes 132, 133 and 134 are shown connected with ducts in the cylindrical sleeves 97, 98 and 99 in the same manner as in FIG. 1. Additional pipes 136, 137 and 138 connect respectively with the body sections 96a, 96b and 96d. All of these pipes extend to the monitoring panel 139 which is provided with the differential pressure operated guages 141, 142 and 143. Thus pipes 132 and 136 connect with guage 141, pipes 133 and 137 connect with guage 142, and pipes 134 and 138 connect with the guage 143. It is assumed that these guages are constructed whereby they indicate the magnitude of the difference between the pressures applied to the pipes connected to the same. When all of the sealing assemblies are moved to the position shown in FIG. 8, each of the guages should indicate a pressure differential which, for example, may be of the order of 15 p.s.i. So long as this pressure differential is maintained, the operator is apprised of the fact that no leakage is occurring past any of the assemblies. When the closure assemblies are moved to the position shown in FIG. 9, the guages 141 and 143 should indicate a pressure differential, and as long as this differential is maintained, no leakage is occurring past the assemblies 102 and 103. When the assemblies are shifted to the position shown in FIG. 10, the pressure differential is indicated by guages 141 and 142, and again as long as this differential is maintained, no leakage can occur past the assemblies 101 and 102.

It will be evident that the diverter shown in FIGS. 8 – 10 can be used to advantage in tank farm systems where tanks are being filled from a fill manifold, and the tanks are selectively discharged. The use of the present invention greatly simplifies the valving normally used for such purpose, thus greatly reducing the cost of such installations. In addition, the diverters of the present invention are relatively simple to construct and to operate and control, and require a minimum amount of power.

We claim:

1. In a flow diverter, a generally cylindrical shaped body formed from a plurality of sections, means for closing the ends of the body, certain sections of the body having side flow openings to provide at least first, second and third flow openings spaced along the length of the body, a first cylindrical sleeve carried by the body and positioned between the first and second flow openings, a second cylindrical sleeve carried by the body and spaced axially from the first sleeve and positioned between the second and third flow openings, each sleeve having an internal cylindrical surface of like internal diameter that is less than the internal diameter of adjacent sections of the body and of substantial axial length, first and second sealing assemblies adapted to have sealing engagement with the inner peripheral surfaces of the sleeves, operating rod means extending axially of the body, the sealing assemblies being carried by said operating rod means, means external of the body for actuating the rod means to position the sealing assemblies in predetermined operating positions, each sealing assembly comprising two axially spaced and oppositely faced sealing cups of resilient material constructed to have sealing engagement with the inner cylindrical surface of a sleeve on axially spaced annular sealing areas, the sealing cups of each sealing assembly being dimensioned to have an external diameter greater than the inner diameter of a cooperating sleeve when in a position displaced from the sleeve whereby each resilient member is contracted radially when moved axially to a position within a sleeve, the space between the sealing cups of each sealing assembly being closed when the assembly is within a sleeve, the positioning of the sealing assemblies on the rod means and the positioning of said assemblies within or out of the sleeves serving to divert flow through the body by way of either a flow path between the first and second flow openings or a flow path between the second and third flow openings.

2. Apparatus as in claim 1 in which a portion of each sleeve is interposed between adjacent sections of the body.

3. A plurality of diverters as defined in claim 1 together with two outflow headers, one of the headers being connected to first flow openings of the diverters, and the other header being connected to the third flow openings of the diverters.

4. A flow diverter as in claim 1 in which means is provided to balance differential pressure applied to at least one of the sealing assemblies, said means including a third sealing assembly carried by the rod means, a third sleeve carried by the body and spaced axially from the first and second named sleeves, the last named assembly being positioned within the third sleeve when the rod means is in one operating position, the body being formed to provide a closed body space on that side of the third assembly remote from the first and second sleeves when the third assembly is within the third sleeve, and means forming a flow connection between said closed body space and the second flow opening.

5. Apparatus as in claim 1 in which the rod means consists of a tube to which the sealing assemblies are secured, and in which a guide rod extends into the tube and is secured at its one end to the body.

6. Apparatus as in claim 1 in which means is provided for sensing the pressure in the space between the sealing members of each sealing assembly when one such assembly is within one of said sleeves and when both of said assemblies are each within a sleeve.

7. A metering system comprising a plurality of meter runs, each run including a flow meter, an inlet header adapted to be connected to the upstream portion of the main flow line, valves serving to connect the header with each of the meter runs, whereby by operation of said valves flow can be established through any one or more of the meter runs, a diverter valve as defined in claim 1 having its second flow opening connected to the discharge end of the associated meter run, two outflow headers, the first flow opening of the diverter being connected to one of said headers, the third flow opening of the diverter being connected to the second header, and a meter prover having flow connections to the headers.

* * * * *